H. E. WRIGLEY.

Improvement in Tape-Measures for Gauging the Liquid Contents of Vessels.

No. 129,639.  Patented July 16, 1872.

Witnesses
William J. Peyton
Parker H. Sweet, Jr.

Inventor
Henry E. Wrigley
By James L. Norris
Attorney

UNITED STATES PATENT OFFICE.

HENRY E. WRIGLEY, OF TITUSVILLE, PENNSYLVANIA.

IMPROVEMENT IN TAPE-MEASURES FOR GAUGING THE LIQUID CONTENTS OF VESSELS.

Specification forming part of Letters Patent No. 129,639, dated July 16, 1872.

I, HENRY E. WRIGLEY, of Titusville, Crawford county, Pennsylvania, have invented a new and Improved Tape-Measure for Gauging Cylindrical Vessels, of which the following is a complete description, reference being had to the accompanying drawing.

The object of my invention is that of rapidly and accurately gauging the contents of cylindrical vessels.

To understand more fully the nature of my improvement I would say that the common method now in use for ascertaining the contents of a tank or other vessels is to take the circumference at the top and bottom of the tank with an ordinary tape-measure, graduated to feet, inches, and parts of an inch. Then the mean sectional area, together with the height and thickness of stave, will give, by calculation, the contents in cubic feet and gallons.

My improvement consists in preparing a tape of steel, brass, or other suitable material, and marking or graduating the same, so that it shall indicate, when encircling the tank or vessel, the contents of the same in gallons and decimals of a gallon, or any other unit of measure for any stated perpendicular height; also, in graduating the other side of the tape, at one end, to indicate the required reduction in the circumference taken for the thickness of the stave; also, in the construction of the end piece of the tape, so as to allow of a closer measurement.

Figure 1:
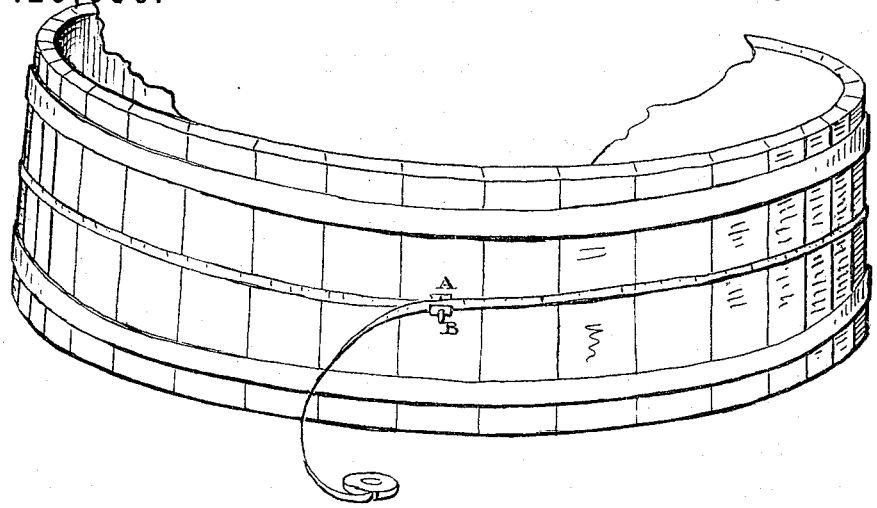
Figure 2:
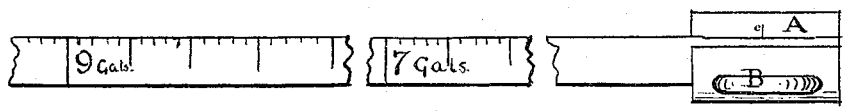
Figure 3:
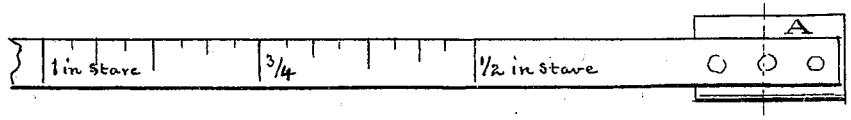
Figure 4:
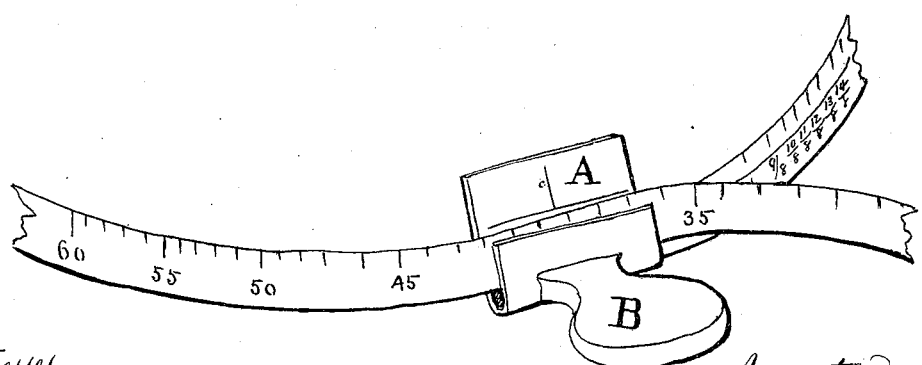

In the drawing hereto annexed, Figure 1 shows the tape stretched around a tank, and the manner of its fastening through the end piece A B. Fig. 2 shows the side or part of the tape marked in gallons, together with a front view of the end piece. Fig. 3 shows the other side of the tape, marked with the reductions in circumference for various thicknesses of staves. Fig. 4 shows a perspective view of the end piece, showing the method of lapping the tapes through it and upon each other.

Example.

Supposing a tape graduated to indicate the contents, in gallons and decimals of a gallon, for one inch in height. If a tank is to be measured, the average thickness of the stave is first ascertained and found to be one and a half inch; the inside height of the staves is measured and found to be forty inches. The tape is then passed round the bottom of the tank, lapped in the slot of the end piece A B, and the number of gallons indicated by the intersection of the center line C. The tape is then taken off of the tank and readjusted at the measurement just taken. The length to be deducted for the thickness of stave, as denoted upon the other side, is now lapped over by drawing the two ends of the tape together through the end piece, and the reduced number of gallons noted will be the actual contents of the inside diameter for one inch in height. The same process is repeated at the top or any other part of the tank, and the average contents for one inch ascertained. This, when multiplied by the number of inches in height, will give the contents in gallons.

I claim—

The tape-line, graduated to indicate for given units of height the contents of cylindrical vessels, combined with the handle-index A B, and provided with the reverse scale for indicating the proper reduction of capacity for the thickness of the staves or the wall of the vessel, substantially as described.

HENRY E. WRIGLEY.

Witnesses:
ARCHIE R. GRAY,
C. W. GRASS.